(12) United States Patent
Gullo et al.

(10) Patent No.: US 7,962,421 B2
(45) Date of Patent: Jun. 14, 2011

(54) RESIDENTIAL DELIVERY INDICATOR

(75) Inventors: John F. Gullo, Alexandria, VA (US);
James D. Wilson, Collierville, TN (US);
Robert F. Snapp, Memphis, TN (US);
David J. Payne, Collierville, TN (US)

(73) Assignee: United States Postal Service, Washington, DC (US)

(*) Notice: Subject to any disclaimer, the term of this patent is extended or adjusted under 35 U.S.C. 154(b) by 549 days.

(21) Appl. No.: 10/311,466

(22) PCT Filed: Mar. 25, 2002

(86) PCT No.: PCT/US02/08835
§ 371 (c)(1),
(2), (4) Date: Dec. 16, 2002

(87) PCT Pub. No.: WO02/077769
PCT Pub. Date: Oct. 3, 2002

(65) Prior Publication Data
US 2004/0006508 A1    Jan. 8, 2004

Related U.S. Application Data

(60) Provisional application No. 60/277,949, filed on Mar. 23, 2001.

(51) Int. Cl.
*G06Q 10/00* (2006.01)
*G06Q 30/00* (2006.01)
*G06F 17/00* (2006.01)

(52) U.S. Cl. .......... 705/338; 705/1.1; 705/402; 705/404

(58) Field of Classification Search .......... 705/402, 705/1, 404, 338
See application file for complete search history.

(56) References Cited

U.S. PATENT DOCUMENTS

| | | | |
|---|---|---|---|
| 4,871,903 A | 10/1989 | Carrel | |
| 5,420,403 A * | 5/1995 | Allum et al. | 235/375 |
| 5,535,127 A * | 7/1996 | Uno et al. | 705/406 |
| 5,734,568 A * | 3/1998 | Borgendale et al. | 700/224 |
| 6,135,292 A * | 10/2000 | Pettner | 209/603 |
| 6,316,741 B1 | 11/2001 | Fitzgibbons et al. | |
| 6,320,670 B1 * | 11/2001 | Kenbeek | 358/1.16 |
| 6,321,214 B1 * | 11/2001 | Thiel | 705/408 |
| 7,397,009 B2 * | 7/2008 | O'Donohue et al. | 209/584 |
| 2004/0083190 A1 * | 4/2004 | Sanders | 705/404 |
| 2007/0073551 A1 * | 3/2007 | Williams et al. | 705/1 |

OTHER PUBLICATIONS

Jindel, Satish, "Guarantee It", Jan. 24, 2000, Traffic World, V. 261, n. 4, pp. 47.*
International Search Report, Sep. 18, 2002.
International Preliminary Examination Report, dated Oct. 7, 2004, for International Application No. PCT/US02/08835, filed Mar. 25, 2002 (6 pages).
Written Opinion, dated Apr. 15, 2004, for International Application No. PCT/US02/08835, filed Mar. 25, 2002 (4 pages).

* cited by examiner

*Primary Examiner* — Fadey S Jabr
(74) *Attorney, Agent, or Firm* — Finnegan, Henderson, Farabow, Garrett & Dunner, L.L.P.

(57) ABSTRACT

This invention provides methods, apparatus, and systems for classifying addresses. An address is evaluated based upon a postal code or standardized postal code, such as a U.S. Postal Service ZIP+4 code, serving the address. If the address cannot be classified based on the standardized postal code, the address is classified based on additional information, such as a U.S. Postal Service delivery point code. A mailer may then determine whether the address is a business or residential (or non-business) address. Furthermore, a mailer may predict when surcharges may apply and compare the rates of various carriers.

21 Claims, 7 Drawing Sheets

RESIDENTIAL DELIVERY INDICATOR

CROSS REFERENCE TO RELATED APPLICATIONS

This application claims the benefit of U.S. Provisional Patent Application No. 60/277,949, entitled "RESIDENTIAL DELIVERY INDICATOR," filed on Mar. 23, 2001, the disclosure of which is expressly incorporated herein by reference in its entirety.

TECHNICAL FIELD

The present invention relates to classifying addresses. More particularly, it relates to methods, apparatus, and systems for classifying delivery addresses for pieces of mail.

BACKGROUND

Mailing addresses are generally classified as either business (or commercial) or residential (or non-business). Many carriers, such as a non-U.S. Postal Service carrier, may apply a surcharge for a mail piece based on the classification of the address for the mail piece. For example, many carriers apply a surcharge when delivering a mail piece to a residential address. These surcharges can add significant cost to the delivery rate for a mail piece.

Typically, a mailer makes a shipping decision by selecting between several carriers based upon costs, such as the delivery rate. Unfortunately, due to surcharges, determining the delivery rate of various carriers when making the shipping decision can be difficult. For example, many carriers do not inform mailers of addresses where surcharges apply or only identify surcharges on outbound shipping manifests. Thus, a mailer is often unable to accurately compare costs of different carriers when making a shipping decision.

Accordingly, it would be desirable to identify the classification of an address prior to shipping to determine if any surcharges may apply. Furthermore, it would be desirable to overcome these and other shortcomings of the prior art.

SUMMARY

In accordance with an embodiment consistent with the principles of the present invention, an address is classified. A standardized postal code and a delivery point code is determined for the address. Based on the standardized postal code, a first table is searched. When the standardized postal code is found within the first table, a first classification for the address is provided. When the standardized postal code is not found within the first table, a second table is searched based on the delivery point. When the delivery point code is found within the second table, the first classification for the address is provided.

In accordance with another embodiment consistent with the principles of the present invention, an address is classified. A standardized postal code is determined for the address. Based on the standardized postal code, a table is searched. When the standardized postal code is found within the table, the classification for the address is provided.

In accordance with another embodiment consistent with the principles of the present invention, a carrier to deliver a piece of mail is determined. Address information indicating a destination for the piece of mail is received. Based on the address information, a classification for the destination is determined. At least one or a plurality carriers is selected to deliver the piece of mail based on the classification for the destination.

In accordance with another embodiment consistent with the principles of the present invention, a piece of mail is classified. Address information indicating a destination for a piece of mail is received. Based on the address information, a first parameter is determined. Based on the first parameter, a second parameter is identified. A classification for the destination for the piece of mail is determined based on at least one of the first and second parameters.

In accordance with another embodiment consistent with the principles of the present invention, address information indicating a destination for a piece of mail is received. Based on the address information, a first parameter is determined. Based on the first parameter and the address information, a second parameter is determined. A classification for the destination for the piece of mail is determined based on at least one of the first and second parameters.

In accordance with another embodiment consistent with the principles of the present invention, a system comprises an input, a first table, a second table, and a processor. The input receives address information indicating a destination of a piece of mail. The first table stores information relating to a first number identifying an area of the destination for the piece of mail. The second table stores information relating to a second number identifying the destination for the piece of mail. The processor determines a classification for the destination for the piece of mail based on at least one of the first and second numbers.

In accordance with another embodiment consistent with the principles of the present invention, a computer readable comprises: a plurality of information indicating standardized postal codes assigned to areas that consist of addresses classified as a business; program code for determining a standardized postal code for a destination for a piece of mail, and determining the classification for the destination for the piece of mail based on the determined standardized postal code and the plurality of information indicating standardized postal codes.

In accordance with another embodiment consistent with the principles of the present invention, a computer readable medium comprises: a first table that includes a plurality of entries indicating standardized postal codes assigned to areas that consist of addresses classified as a business; a second table that includes a plurality of entries indicating delivery point codes for addresses classified as a business; program code for determining a standardized postal code and a delivery point code for a destination of a piece of mail, and determining a classification of the destination for the piece of mail based on the first table, the second table, the determined standardized postal code for the destination, and the determined delivery point code for the destination.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

In the figures.

DESCRIPTION OF THE EMBODIMENTS

Reference will now be made in detail to exemplary embodiments of the invention, which are illustrated in the accompanying drawings. Wherever possible, the same reference numbers will be used throughout the drawings to refer to the same or like parts.

By classifying an address, such as a U.S. Postal Service delivery addresses, a mailer may anticipate when a carrier may apply a surcharge prior to shipping. An address may first be classified based upon a postal code, such as a ZIP+4 code, serving the address. If the address cannot be classified based on the postal code, then the address may be classified based upon additional information, such as a U.S. Postal Service delivery point code. For example, some ZIP+4 codes may include both business and residential (or non-business) addresses. Based upon the classification, a mailer may then determine the delivery rates of one or more carriers for a mail piece including, for example, surcharges for delivering to residential addresses.

Figure 1:
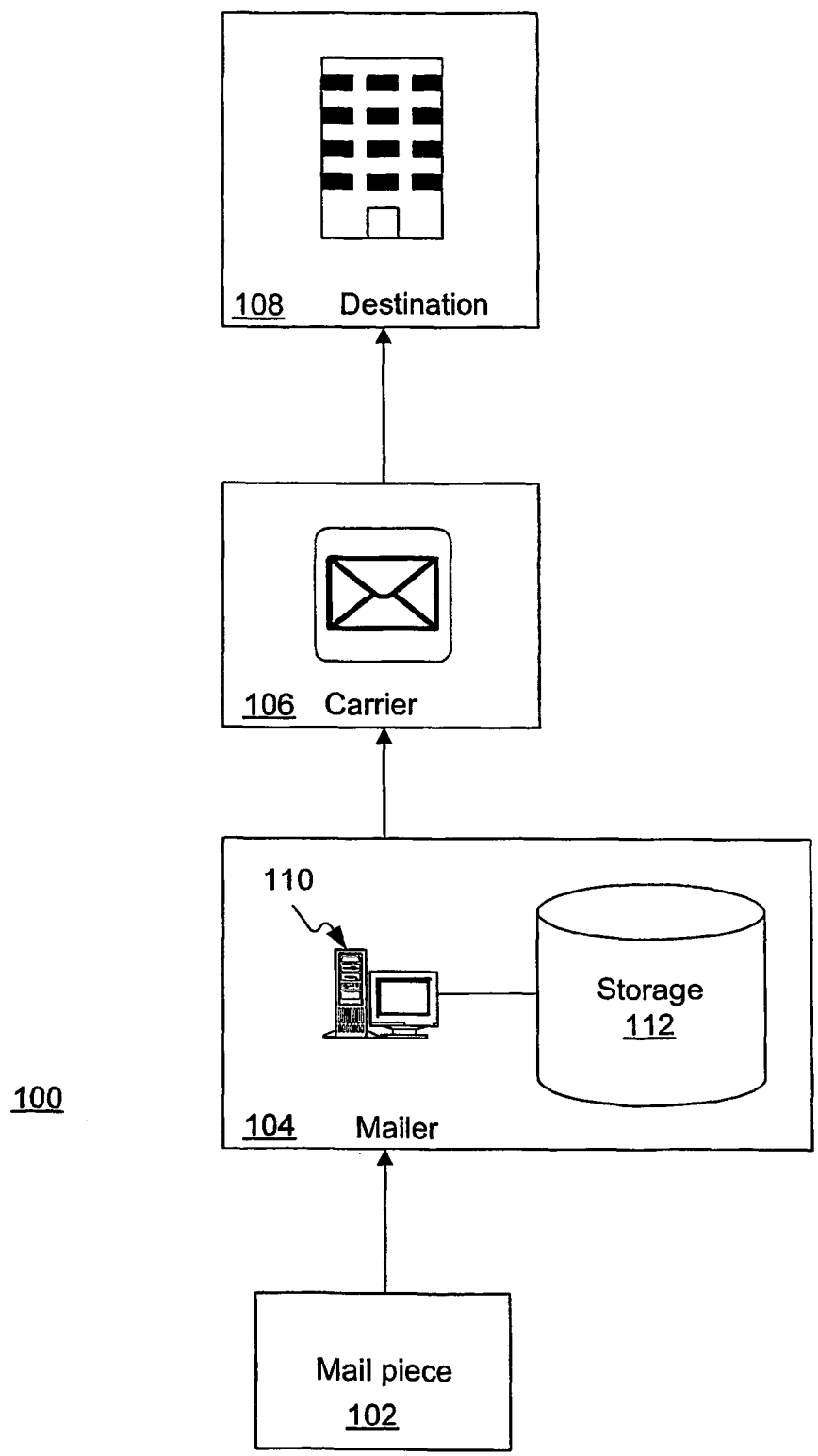
FIG. 1 shows a system for classifying delivery addresses and selecting a carrier, in accordance with methods, apparatus, and systems consistent with the principles of the present invention.

FIG. 1 shows a system 100 for classifying delivery addresses and selecting a carrier, in accordance with methods, apparatus, and systems consistent with the principles of the present invention. As shown, system 100 includes a mail piece 102, a mailer 104, a carrier 106, and a destination 108.

Mailpiece 102 may be any item of mail, such as a letter or package. Mailpiece 102 may include an address (not shown) indicating the destination for delivering mailpiece 102. The address may include information, such as street number; street name; city; state, province, or county; and a postal code, the postal code may be alphabetical only, alphanumeric, or pure numeric, such as a U.S. Postal Service ZIP code. The postal code may identify an area in which the destination is located. The postal code may represent a geographic area, one or more buildings, or a single business (or company). In addition, the address may include a standardized postal code, such as a ZIP+4 code.

Mailer 104 may be any entity that sends mailpiece 102. For example, mailer 104 may be a person, a business, or an organization. Mailer 104 may include a server 110 and a storage platform 112.

Server 110 may be implemented on a general purpose computer, such as a personal computer. For example, server 110 may be implemented on a computer executing the Windows operating system. Alternatively, server 110 may be implemented using the UNIX operating system.

Storage platform 112 may be implemented on known storage or memory devices. For example, storage platform 112 may be implemented in a database, a hard disk drive, a compact disk drive, or other types of memory. Although storage platform 112 is shown within mailer 104, storage platform 112 may be accessed across a network (not shown), such as a local area network or wide area network. For example, mailer 104 may remotely access storage platform 112 across the Internet. Server 110 and storage platform 112 are further described with reference to FIG. 2.

Carrier 106 may be any entity which transports or delivers mail. For example, in one embodiment carrier 106 may be the U.S. Postal Service. Although FIG. 1 shows one carrier, system 100 may include multiple carriers including non-U.S. Postal Service carriers.

Destination 108 is the location to which mailpiece 102 is directed. For example, destination 108 may be classified as a business (or commercial) location, or a residential (or non-business) location, such as a house or apartment. In one embodiment, destination 108 may classified by the U.S. Postal Service as either a "business" address or a "residential" address. Other classifications, such as "post office box" or "general delivery", may also be used.

Figure 2:
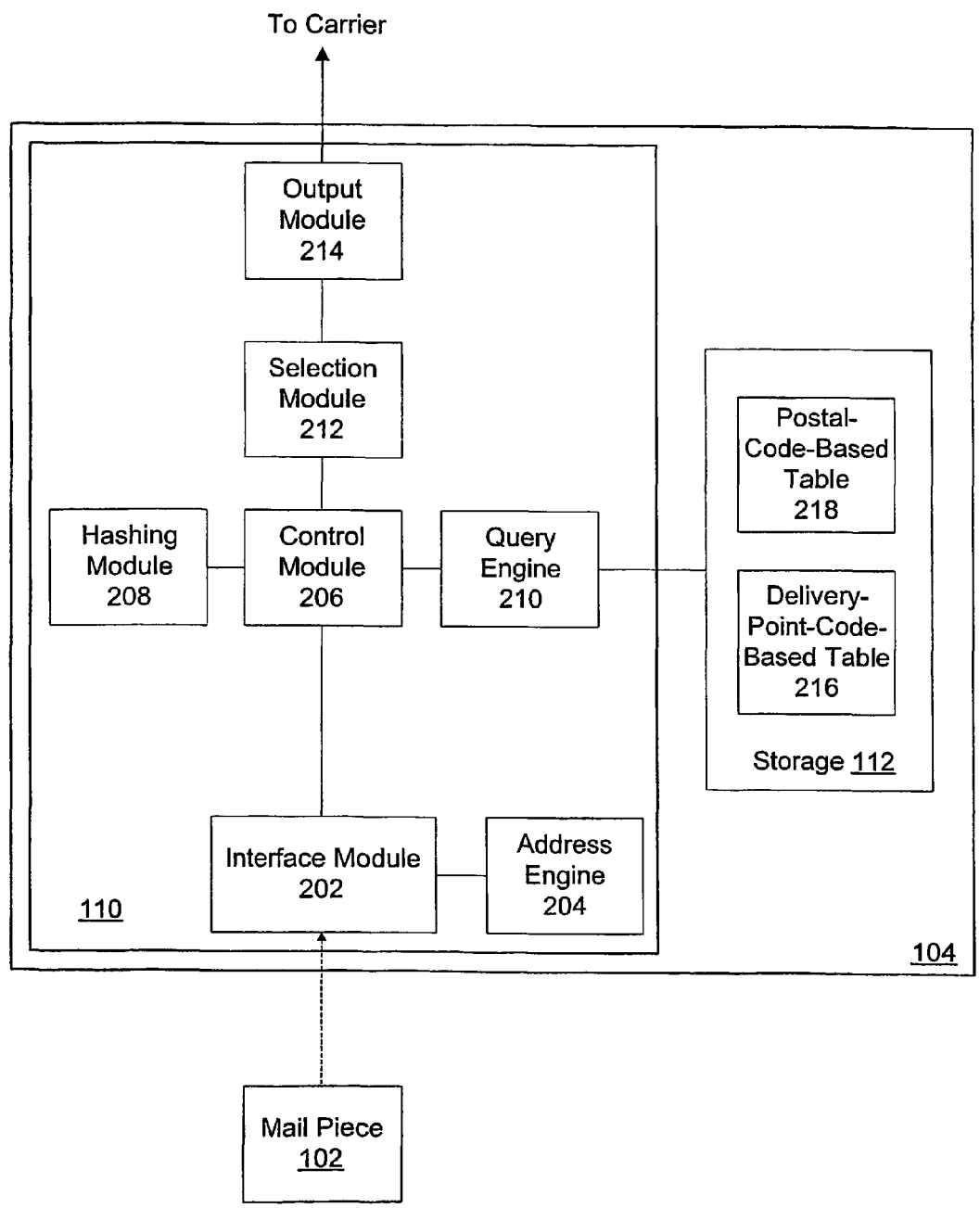
FIG. 2 shows a block diagram of a mailer, in accordance with methods, apparatus, and systems consistent with the principles of the present invention.

FIG. 2 shows a block diagram of mailer 104, in accordance with methods, apparatus, and systems consistent with the principles of the present invention. As shown, server 110 may include an interface module 202, an address engine 204, a control module 206, a hashing module 208, a query engine 210, a selection module 212, and an output module 214. In addition, storage platform 112 may include a postal code-based table 216, and a delivery point code-based table 218.

Interface module 202 receives information indicating the destination of mailpiece 102. Interface module 202 may receive information, such as a street number, a street address, a city, a state, a postal code (such as a ZIP code), a standardized postal code (such as a ZIP+4 code), or a destination code, such as a U.S. Postal Service delivery point code. A destination code may provide more detailed information to identify a destination for mailpiece 102 and may include any combination of text and numerals. For example, a U.S. Postal Service delivery point code may uniquely identify a single destination based on the destination's standardized postal code and digits from the street address.

Interface module 202 may receive information based on information entered by a user; information read from mailpiece 102, such as via an optical scanner; information read from a list (or table), such as a manifest; or data read from a file or computer readable medium. Interface module 202 may be implemented using any combination of hardware and software. For example, interface module 202 may include devices such as a keyboard, a mouse, or a display. In addition, interface module 202 may include software implemented in program code, such as MICROFOCUS™ COBOL.

Address engine 204 may verify or complete the information indicating the destination of mailpiece 102. For example, interface module 202 may receive a Postal Service address, or a portion of the Postal Service address for mailpiece 102. Address engine 204 may then verify or complete the information received by interface module 202. For example, a ZIP+4 code and delivery point code may be determined for a Postal Service address using a utility, such as the U.S. Postal Service "Coding Accuracy Support System" (CASS™) application. The CASS™ application uses a file known as the "Delivery Sequence File" (DSF) to determine whether a mailer's address matches a U.S. Postal Service standardized address. Other types of address engines for verifying or completing delivery addresses may be used in server 110. Address engine 204 may also be implemented as a separate application external to server 110.

Alternatively, server 110 may be implemented without address engine 204. For example, interface module 202 may require that received information conform with U.S. Postal Service standardized address information.

Control module 206 controls the operation of server 110 and the classification of the information indicating the destination of mailpiece 102. For example, control module 206 may receive information from interface module 202, calculate a hash using hashing module 208, and search information in storage platform 112 using query engine 210. Control module 206 may be implemented using program code, such as MICROFOCUS™ COBOL. Other functions may also be performed by control module 206.

Hashing module 208 may calculate hash values based on the information indicating the destination of mailpiece 102. As is well-known to those skilled in the art, a "hash" is a mathematical value calculated from an input value using a mathematical rule, or algorithm. In module 208, a hash is calculated or generated using an algorithm such that a small change in a base value produces a large change in the hash value. Hashing algorithms may be designed as "one-way" algorithms, such that the original base value cannot be recreated from a hash. Hashing may provide improved security, such as if server 110 and storage platform 122 are communicating across a network.

In addition, hashing may be used to allow for more efficient searching. Postal codes, standardized postal codes, and delivery point codes often are "clustered" due to concentrations in population. For example, U.S. Postal Service postal codes beginning with "9" are a known cluster for the state of California. Hashing allows a cluster to be "spread" out over a greater range of values and, thus, may allow for more efficient searching.

In one embodiment, hashing module 208 uses version 1 of the Secure Hashing Algorithm (SHA-1). The SHA-1 algorithm is a known algorithm developed by the National Institute of Standards and Technology (NIST) along with the National Security Agency. FIPS PUB 180-1, Federal Information Processing Standards (Apr. 17, 1995), titled "Specification for Secure Hash Standard," describes, inter alia, the implementation of the SHA-1 algorithm. However, hashing module 208 may use any hashing algorithm.

Query engine 210 processes queries and searches for information from storage platform 112. For example, query engine 210 may query information from storage platform 112 based on information, such as a postal code, to determine a classification of the destination for mailpiece 102. Query engine 210 may be implemented using any combination of known hardware or software. For example, query engine 210 may be implemented in software using program code, such as MICROFOCUS™ COBOL.

Selection module 212 may select a carrier, such as the U.S. Postal Service, from among a group of carriers. Selection module 212 may select a carrier based on the information indicating the destination of mailpiece 212 and the classification of the destination. For example, selection module 212 may calculate a delivery rate that includes surcharges for certain classifications, such as residential addresses, for each carrier. Based on the calculated delivery rate, selection module 212 may select one or more carriers from the group of carriers. Selection module 212 may select the one or more carrier based on a variety of factors, such as cost, or time for delivery. For example, selection module 212 may select a carrier based on delivery rate.

Output module 214 provides information to carrier 106 for delivering mailpiece 102 to destination 108. For example, output module 214 may provide the address for destination 108 and the determined classification for destination 108. Output module 214 may provide the classification for destination 108 using an indicator, such as yes/no, or business/residential, to indicate the determined classification for destination 108. Output module 214 may provide the information in a variety of ways, such as a display, a printer, or data in a file.

As shown in FIG. 2, mailer 104 may also include storage platform 112. Storage platform 112 may further include delivery point code-based table 216 and postal code-based table 218. Delivery point code based table 216 may include entries based on postal service delivery point codes and indicate a respective classification, such as business or residential. For example, in one embodiment, delivery point code-based table 216 may include delivery point codes for addresses classified as businesses in certain U.S. Postal Service delivery areas, such as delivery areas having both business and residential addresses. Delivery-point-code based table 216 is further described with reference to FIG. 4.

Postal code-based table 218 may include entries based on standardized postal codes and indicate a respective classification, such as business or residential. For example, in one embodiment, postal code-based table 218 may include entries based on standardized postal codes, such as ZIP+4 codes, that exclusively contain addresses classified as businesses. Postal code-based table 218 is further described with reference to FIG. 3.

Delivery point code-based table 216 and postal code-based table 218 may be created in a wide variety of ways. For example, in one embodiment, tables 216 and 218 may be created from the "Delivery Point File" (DPF) maintained by the Address Management Service of the U.S. Postal Service. Alternatively, tables 306 and 308 may be created based on the "Delivery Sequence File" (DSF) also maintained by the U.S. Postal Service. The DPF and DSF are computerized files that contain all delivery point addresses serviced by the U.S. Postal Service, with the exception of general delivery. In the DPF and DSF, each delivery point is a separate record that conforms to U.S. Postal Service addressing standards.

Each record may contain the ZIP+4 code, carrier route code, delivery sequence, delivery type, and seasonal delivery information. Thus, the DPF or DSF may be used to create tables which allow for: address validation; address standardization; ZIP+4 coding; carrier route coding; delivery sequence; detection of addresses that are potentially undeliverable for reasons other than a change of address; delivery-type code information that indicates whether the address is classified, for example, as residential or business; and seasonal delivery information. However, any way of creating tables based on ZIP+4 codes and delivery point codes is consistent with the principles of the present invention.

Tables 216 and 218 may be maintained in a wide variety of ways. For example, in one embodiment, tables 216 and 218 are updated on a periodic basis, such as, monthly or weekly. Alternatively, tables 216 and 218 may be provided on a periodic basis using a storage medium, such as, a CD-ROM.

Tables 216 and 218 may also be provided via a download over a network using, for example, a file transfer protocol (FTP) download over the Internet. Other known ways of maintaining tables 216 and 218 are consistent with the principles of the present invention.

Figure 3:
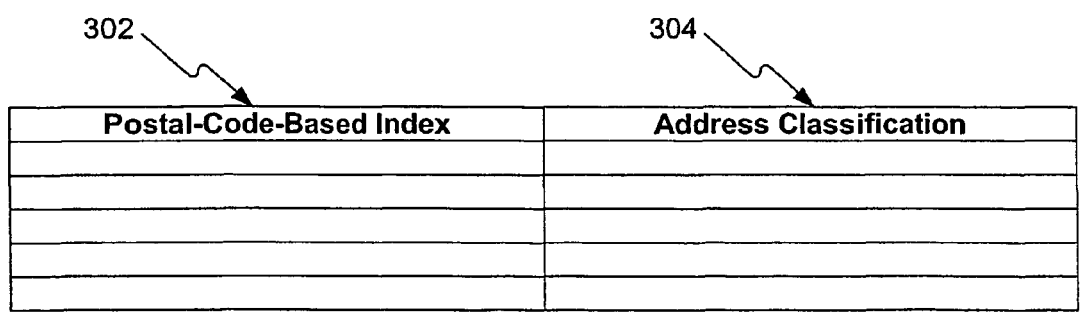
FIG. 3 shows a first table, in accordance with methods, apparatus, and systems consistent with the principles of the present invention.

FIG. 3 shows a first table, such as postal code-based table 218, in accordance with methods, apparatus, and systems consistent with the principles of the present invention. As shown, postal code-based table 218 includes a postal-code-based index column 302, and an address classification column 304.

Postal-code-based index column 302 includes information based on standardized postal codes. For example, in one embodiment, postal-code-based index column 302 includes hash values for standardized postal codes, such as U.S. Postal Service ZIP+4 codes.

Address classification column 304 includes information to indicate a respective classification for a particular standardized postal code. For example, address classification column 304 may include indicators, such as yes/no or residential/business.

Alternatively, in one embodiment, address classification column 304 may be eliminated from postal code-based table 218. For example, postal-code-based index column 302 may include only hash values for ZIP+4 codes that exclusively contain addresses classified as businesses and, thus, address classification column 304 may not be needed.

Figure 4:
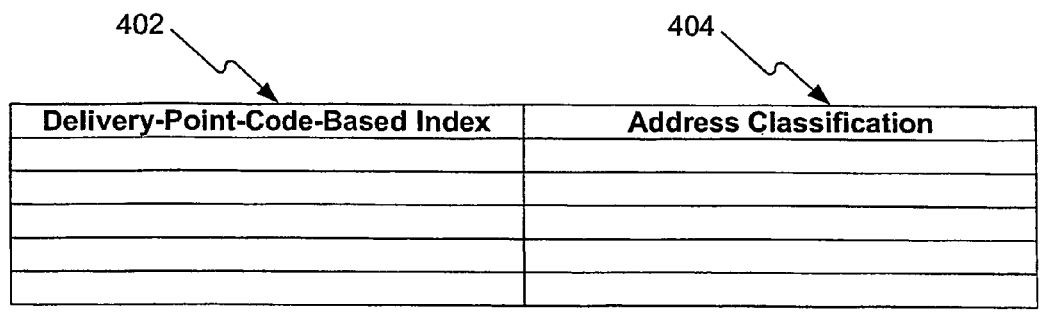
FIG. 4 shows a second table, in accordance with methods, apparatus, and systems consistent with the principles of the present invention.

FIG. 4 shows a second table, such as delivery point code-based table 216, in accordance with methods, apparatus, and systems consistent with the principles of the present invention. As shown, delivery point code-based table 216 includes a delivery-point-code-based index column 402, and an address classification column 404.

Delivery-point-code-based index column 402 includes information based on U.S. Postal Service delivery point codes. For example, in one embodiment, delivery-point-code-based index column 402 includes hash values of U.S. Postal Service delivery point codes.

Address classification column 404 includes information to indicate a respective classification for a particular delivery point code. For example, address classification column 404 may include indicators, such as yes/no or residential/business.

Alternatively, in one embodiment, address classification column 404 may be eliminated from delivery point code-based table 216. For example, delivery-point-code-based index column 402 may only include hash values for delivery point codes for addresses classified as businesses and, thus, address classification column 404 may not be needed.

Figure 5:
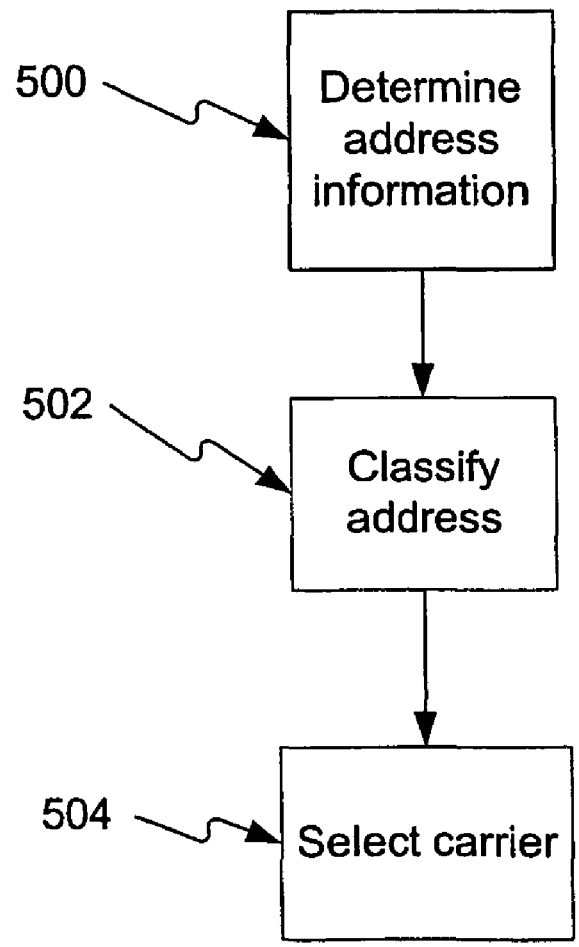
FIG. 5 shows a process for selecting a carrier, in accordance with methods, apparatus, and systems consistent with the principles of the present invention.

FIG. 5 shows a process for selecting a carrier, in accordance with methods, apparatus, and systems consistent with the principles of the present invention. In step 500, mailer 104 determines address information indicating a destination for mailpiece 102. For example, a user may provide a U.S. Postal Service standardized address to interface module 202. Optionally, interface module 202 may verify or complete the address information and, for example, determine a U.S. Postal Service delivery point code. Alternatively, a user may provide a portion of the address information, such as a postal code, standardized postal code, or delivery point code.

In step 502, mailer 104 determines a classification for the destination of mailpiece 102. For example, control module 206 calculate a hash value based on the delivery point code and provide the hash value to query engine 210. Query engine 210 may then search delivery point code-based table 216 or ZIP+4 based 218 based on the hash value. Based on the search of either table, control module 206 then determines the classification for the destination of mailpiece 102.

In step 504, mailer 104 selects a carrier. For example, control module 206 may provide the address information and the classification for the destination of mailpiece 102 to selection module 212. Selection module 212 may then select one or more carriers from a group of carriers based on the address information and the classification. Selection module 212 may then provide information, such as the address information and classification to output module 214. Output module 214 may then pass the address information and classification to the selected carrier.

Figure 6:
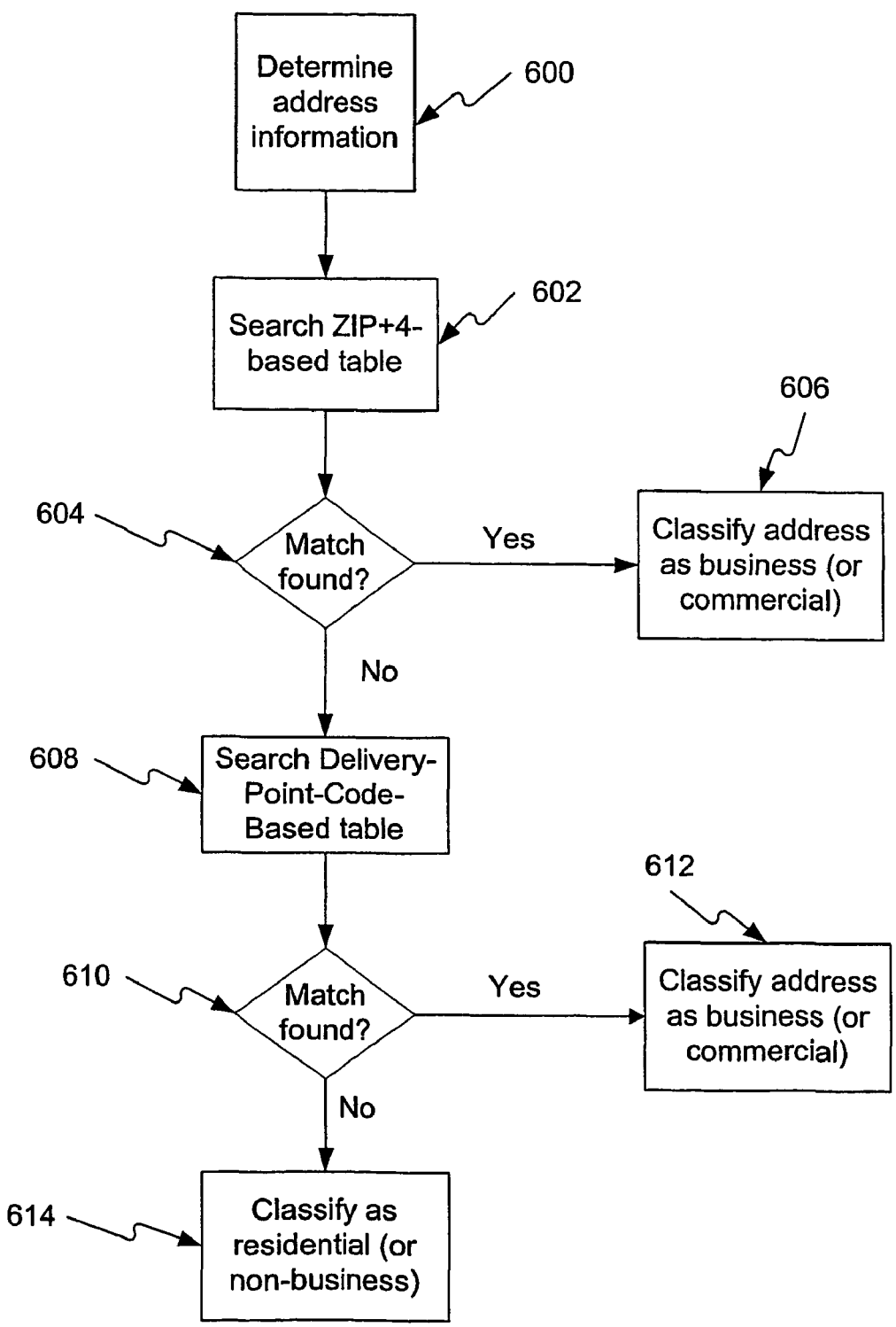
FIG. 6 shows an embodiment of a method for classifying an address, in accordance with methods, apparatus, and systems consistent with the principles of the present invention.

FIG. 6 shows an embodiment of a method for classifying an address, in accordance with methods, apparatus, and systems consistent with the principles of the present invention. In step 600, mailer 104 determines address information indicating the destination of mailpiece 102. For example, interface module 202 may receive information, such as a street number, a street address, a city, a state, a postal code, such as a ZIP code, a standardized postal code, such as a ZIP+4 code, or a destination code, such as a U.S. Postal Service delivery point code. In addition, address engine 204 may optionally verify or complete the address information received by interface module 202.

In step 602, postal code-based table 218 is searched based upon the address information. For example, control module 206 may determine a standardized postal code based on the address information received by interface module. The standardized postal code may be directly entered, or may be derived from the U.S. Postal Service delivery point code. For example, the standardized postal code may be extracted from nine-digits in the delivery point code.

Control module 206 may then provide the standardized postal code to hashing module 208. Hashing module 208 may calculate a hash value of the standardized postal code and provide the hash value to control module 206. Control module 206 may provide the hash value to query engine 210. Query engine 210 may then search postal code-based table 218 based on the hash value.

In step 604, query engine 210 determines whether the hash value matches an entry in postal code-based table 218. A match may indicate the respective classification for the destination of mailpiece 102. For example, as discussed above, postal code-based table 218 may include postal codes that exclusively contain addresses classified as businesses. If a match is found, processing then flows to step 606. If a match is not found, then processing flows to step 608.

In step 606, query engine 210 reports to control module 206 that a match was found. Control module 206 may then classify the destination for mailpiece 102 based on the match. For example, control module 206 may classify the destination for mailpiece 102 as a business address based on finding a match in postal code-based table 218. In addition, control module 206 may provide an indicator, such as yes/no or residential/business for the destination for mailpiece 102. Control module 206 may use other forms of indicators. Furthermore, control module 206 may provide the indicator to carrier 106, or a user.

If a match is not found, then in step 608 query engine 210 may search delivery point code-based table 216. For example, query engine 210 may report to control module 206 that a match was not found in postal code-based table 218. Control module 206 may then determine a U.S. Postal Service delivery point code for the destination of mailpiece 102. Control module 206 may provide this delivery point code to hashing module 208. Hashing module 208 may calculate a hash value based on the delivery point code and provide the hash value to control module 206. Control module 206 may provide the delivery point code hash value to query engine 210. Query engine 210 may then search delivery point code-based table 216 based on delivery point code hash value.

In step 610, query engine 210 determines whether the delivery point code hash value matches an entry in delivery point code-based table 216. A match may also indicate the classification of the destination for mailpiece 102. For example, delivery point code-based table 216 may include only delivery point codes for addresses classified as businesses. Alternatively, delivery point code-based table 216 may include only delivery point codes for addresses classified as residential. If a match is found, then processing flows to step 612. If a match is not found, then processing flows to step 614.

In step 612, query engine 210 may report to control module 206 that a match was found in delivery point code-based table 216. For example, in one embodiment, control module 206 may classify the destination for mailpiece 102 as a business address based on finding a match. In addition, control module 206 may provide an indicator to report the classification.

In step 614, query engine may report to control module 206 that a match was not found. For example, as discussed above, since delivery point code-based table 216 may only include business addresses, control module 206 may then assume that the destination for mailpiece 102 is a residential address. In addition, control module 206 may provide an indicator to report the classification.

Figure 7:
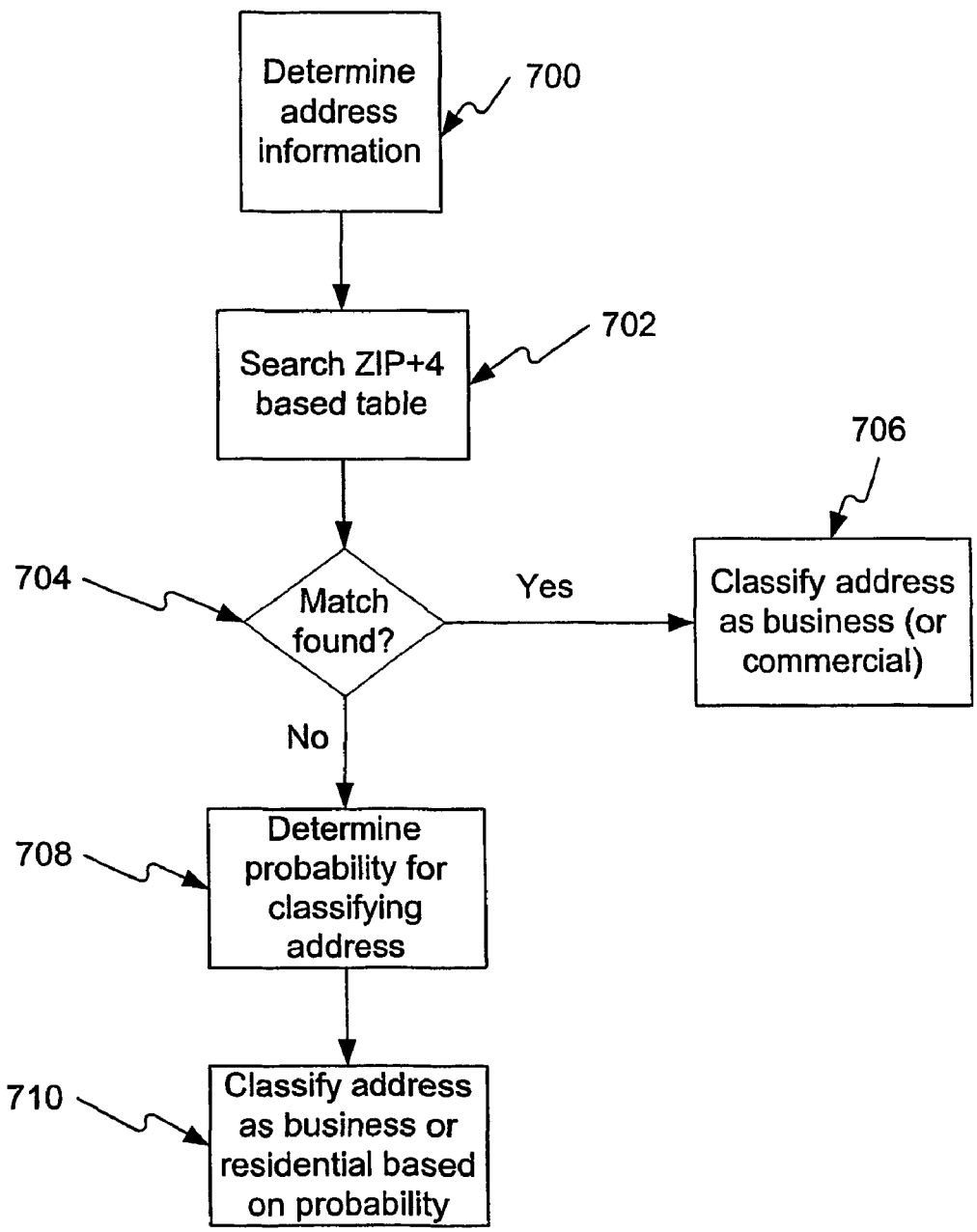
FIG. 7 shows another embodiment of a method for classifying an address, in accordance with methods, apparatus, and systems consistent with the principles of the present invention.

FIG. 7 shows another embodiment of a method for classifying an address, in accordance with methods, apparatus, and systems consistent with the principles of the present invention. In step 700, mailer 104 determines address information indicating the destination of mailpiece 102.

In step 702, postal code-based table 218 is searched based upon the address information. For example, control module 206 may determine a standardized postal code based on the address information received by interface module. The standardized postal code may be directly entered, or may be derived from, for example, a U.S. Postal Service delivery point code.

Control module 206 may then provide the standardized postal code to hashing module 208. Hashing module 208 may calculate a hash value of the standardized postal code and provide the hash value to control module 206. Control module 206 may provide the hash value to query engine 210. Query engine 210 may then search postal code-based table 218 based on the hash value.

In step 704, query engine 210 determines whether the hash value matches an entry in postal code-based table 218. A match may indicate the respective classification for the destination of mailpiece 102. For example, as discussed above, postal code-based table 218 may include postal codes that exclusively contain addresses classified as businesses. If a match is found, processing then flows to step 706. If a match is not found, then processing flows to step 708.

In step 706, query engine 210 reports to control module 206 that a match was found. Control module 206 may then classify the destination for mailpiece 102 based on the match. For example, control module 206 may classify the destination for mailpiece 102 as a business address based on finding a match in postal code-based table 218. In addition, control module 206 may provide an indicator, such as yes/no or residential/business for the destination for mailpiece 102. Furthermore, control module 206 may provide the indicator to carrier 106, or a user.

If a match is not found, then in step 708 query engine 210, as an alternative to searching delivery point code-based table 216, control module 206 may calculate a probability for classifying the destination of mailpiece 102. For example, a study by the U.S. Postal Service revealed that: about 87% of all ZIP+4 codes exclusively serve residential addresses; about 8.5% of ZIP+4 codes exclusively serve business addresses; and about 4.5% ZIP+4 codes serve both residential and business addresses. For example, if postal code-based table 218 includes only residential addresses (e.g., 87% of the ZIP+4 codes) and if query engine 210 does not find a match, then control module 206 may determine that a 35% probability remains that the destination for mailpiece 102 may be a residential address.

In step 710, control module 206 may then classify the destination for mailpiece 102 based on the determined probability. For example, control module 206 may determine the classification based on a threshold probability, such as 50%. Alternatively, control module 206 may report that the destination for mailpiece 102 could not be definitively classified, provide a possible classification and the determined probability of the classification using, for example, a windows message or an email.

Although implementation aspects are depicted as being stored in memory, one skilled in the art will appreciate that all or part of methods, apparatus, and systems consistent with the present invention may be stored on or read from other computer-readable media, such as secondary storage devices, like hard disks, floppy disks, and CD-ROM.

Although specific components of the present invention have been described, one skilled in the art will appreciate that the methods, apparatus, and systems consistent with the present invention may contain additional or different components. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A computer-implemented method for providing a classification of an address on a mailpiece, comprising:
   steps performed by a computer before the mailpiece is mailed, the steps comprising:
      determining a standardized postal code and a delivery point code for the address;
      searching for the standardized postal code in a postal code table;
      displaying a first indicator representing a first classification corresponding to the standard postal code in the postal code table for the address, when the standardized postal code is found within the postal code table;
      searching a delivery point code table for the delivery point code, when the standardized postal code is not found within the postal code table;
      displaying the first indicator representing the first classification corresponding to the delivery point code in the delivery point code table for the address, when the delivery point code is found within the delivery point code table;
      displaying a residential delivery indicator representing a second classification for the address, when the standardized postal code is not found within the postal code table and the delivery point code is not found within the delivery point code table;
      determining whether the mailpiece is subject to surcharges based on at least one of the first or the second classification;

calculating, for a plurality of carriers, a delivery rate of the mailpiece based on at least one of the first or the second classification and the determined surcharges; and selecting a carrier from among the plurality of carriers based on the address, the first or the second classification, a time for delivery, and the delivery rate.

2. The computer-implemented method of claim 1, wherein determining the standardized postal code for the address comprises determining an alphanumeric code for the address, and wherein the postal code table includes standardized postal codes and corresponding classifications.

3. The computer-implemented method of claim 1, wherein determining the standardized postal code for the address comprises determining a numeric code for the address, and wherein the postal code table includes standardized postal codes and corresponding classifications.

4. The computer-implemented method of claim 3, wherein determining the numeric code for the address comprises determining a ZIP code for the address, and wherein the postal code table includes ZIP codes and corresponding classifications.

5. The computer-implemented method of claim 1, wherein the first indicator representing the first classification comprises information indicating the address is classified as a business address.

6. The computer-implemented method of claim 1, wherein the first classification indicates that surcharges apply, and wherein the second classification indicates that surcharges do not apply.

7. The computer-implemented method of claim 1, wherein the delivery point code table is not searched if the standardized postal code is found within the postal code table.

8. A computer-implemented method for classifying mail, comprising:
steps performed by a computer before the mailpiece is mailed, the steps comprising:
receiving, before mailing, address information indicating a destination for a piece of mail;
determining a standardized postal code based on the address information;
determining a delivery point code based on the standardized postal code and the address information;
searching a postal code table for the standardized postal code;
if the standardized postal code is found in the postal code table,
then assigning a first classification corresponding to the standardized postal code from the postal code table to the piece of mail, and
displaying a first indicator representing the first classification,
else:
searching a delivery point code table for the delivery point code, assigning the first classification corresponding to the delivery point from the delivery point code table to the piece of mail, if the delivery point code is found in the delivery point code table, and displaying the first indicator representing the first classification;
if the standardized postal code is not found in the postal code table and the delivery point code is not found in the delivery point code table, then assigning a second classification to the piece of mail, and displaying a residential delivery indicator representing the second classification; and determining whether the piece of mail is subject to surcharges based on at least one of the first or the second classification;
calculating, for a plurality of carriers, a delivery rate of the piece of mail based on at least one of the first or the second classification and the determined surcharges; and
providing, before mailing, a carrier selection from among the plurality of carriers for delivery of the piece of mail based on the first or the second classification and the delivery rate.

9. The computer-implemented method of claim 8, wherein the standardized postal code is a ZIP code of the destination for the piece of mail.

10. The computer-implemented method of claim 8, wherein receiving address information indicating the destination for the piece of mail comprises receiving information indicating a street, a city, and a state of the destination for the piece of mail.

11. The computer-implemented method of claim 8, wherein receiving address information indicating the destination for the piece of mail comprises receiving the delivery point code for the destination.

12. The computer-implemented method of claim 11, wherein determining the standardized postal code based on the address information further comprises:
calculating a hash based on the standardized postal code.

13. The computer-implemented method of claim 11, wherein determining the delivery point code further comprises:
calculating a hash based on the delivery point code.

14. A system for classifying mail, comprising:
an input device that receives, before mailing, address information indicating a destination of a piece of mail;
a postal code table that stores information relating to a postal code identifying an area of the destination for the piece of mail;
a delivery point code table that stores information relating to a delivery point code identifying the destination for the piece of mail; and
a processor that:
searches the postal code table for the postal code;
if the postal code is found in the postal code table, then assigns a first classification from the information stored in the postal code table to the piece of mail, otherwise:
searches the delivery point code table for the delivery point code, and
assigns the first classification from the information stored in the delivery postal code table to the piece of mail, if the delivery point code is found in the delivery point code table; and
assigns a second classification to the piece of mail if the postal code is not found in the postal code table and the delivery point code is not found in the delivery point code table, wherein the second classification comprises a residential address;
determines whether the piece of mail is subject to surcharges based at least one of the first or the second classification; and
calculates, for a plurality of carriers, a delivery rate of the piece of mail based on at least one of the first or the second classification and the determined surcharges;
selects a carrier from among the plurality of carriers based on the address, the first or the second classification, a time for delivery, and the delivery rate; and an output device that:
provides, before mailing, an indicator representing the classification assigned to the piece of mail, and the delivery rate that was calculated based on the classification and the determined surcharges; and
provides the address and the first or the second classification to the selected carrier.

15. The system of claim 14, further comprising:
a storage device that stores the postal code table and the delivery point code table; and
a network communicatively coupling the storage device and the processor.

16. The system of claim 14, wherein the postal code table includes hashed values of standardized postal codes.

17. The system of claim 16, wherein the standardized postal code is a hash of a ZIP code for the destination for the piece of mail.

18. The system of claim 16, wherein the delivery point code table includes hashed values of delivery point codes.

19. The system of claim 18, wherein the delivery point code table includes a hash of the delivery point code for the destination for the piece of mail.

20. A computer-readable storage medium including computer readable code to cause a processor to perform a method for classifying a delivery item, the method comprising:
determining, before the delivery item is mailed, a standardized postal code and a delivery point code for an address on the delivery item;
searching for the standardized postal code in a postal code table;
displaying a first indicator representing a first classification for the address from the information stored in the postal code table, when the standardized postal code is found within the postal code table;
searching a delivery point code table for the delivery point code, when the standardized postal code is not found within the postal code table;
displaying the first indicator representing the first classification for the address from the information stored in the delivery point code table, when the delivery point code is found within the delivery point code table;
displaying a residential delivery indicator representing a second classification for the address if the standardized postal code is not found in the postal code table and the delivery point code is not found in the delivery point code table;
determining whether the delivery item is subject to surcharges based on at least one of the first or the second classification;
calculating, before the delivery item is mailed, for a plurality of carriers, a delivery rate of the delivery item based on at least one of the first or the second classification and the determined surcharges; and
selecting a carrier from among the plurality of carriers based on the address, the first or the second classification, a time for delivery, and the delivery rate.

21. A computer-readable storage medium including computer readable code to cause a processor to perform a method for classifying mail, the method, comprising:
receiving, before mailing, address information indicating a destination for a piece of mail;
determining a standardized postal code based on the address information;
determining a delivery point code based on the standardized postal code and the address information;
searching a postal code table for the standardized postal code;
if the standardized postal code is found in the postal code table,
then assigning a corresponding first classification from the postal code table to the piece of mail, and displaying a first indicator representing the first classification,
else:
searching a delivery point code table for the delivery point code,
assigning the corresponding first classification from the delivery point code table to the piece of mail, if the delivery point code is found in the delivery point code table,
and displaying the first indicator representing the first classification;
if the standardized postal code is not found in the postal code table and the delivery point code is not found in the delivery point code table, then assigning a second classification to the piece of mail, and displaying a residential delivery indicator representing the second classification;
determining whether the piece of mail is subject to surcharges based on at least one of the first or the second classification;
calculating, for a plurality of carriers, a delivery rate of the piece of mail based on at least one of the first or the second classification and the determined surcharges; and
providing, before mailing, a carrier selection from among the plurality of carriers for delivery of the piece of mail based on the first or the second classification and the delivery rate.

* * * * *